(12) United States Patent
Yamada et al.

(10) Patent No.: US 7,226,673 B2
(45) Date of Patent: Jun. 5, 2007

(54) INTEGRATED SINTERED BODIES AND A METHOD OF PRODUCING THE SAME

(75) Inventors: Hirotake Yamada, Anjyo (JP); Tsutomu Naito, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 361 days.

(21) Appl. No.: 10/746,353

(22) Filed: Dec. 24, 2003

(65) Prior Publication Data

US 2004/0138047 A1    Jul. 15, 2004

(30) Foreign Application Priority Data

Jan. 15, 2003    (JP)    ............................ P2003-007488

(51) Int. Cl.
*B32B 9/00* (2006.01)
(52) U.S. Cl. ...................... 428/702; 428/688; 428/689; 428/701
(58) Field of Classification Search ............... None
See application file for complete search history.

(56) References Cited

U.S. PATENT DOCUMENTS 6,620,520 B2 *    9/2003    O'Donnell et al. ......... 428/469

2003/0059653 A1 *    3/2003    Yamada et al. ............. 428/702
2003/0186034 A1    10/2003    Yamada
2003/0232221 A1    12/2003    Yamada et al.
2004/0067329 A1    4/2004    Yamada et al.

FOREIGN PATENT DOCUMENTS

JP    2002-249864 A1    9/2002

OTHER PUBLICATIONS

"Nanocomposites from Melt in the System AI2O3-YAG-ZrO2"; Jose M. Calderon-Moreno and Masahiro Yoshimura; Scripta mater vol. 44; pp. 2153-2156; (2001).*
U.S. Appl. No. 10/837,888, filed May 3, 2004, Yamada et al.
U.S. Appl. No. 10/885,396, filed Jul. 6, 2004, Hirotake Yamada.

* cited by examiner

*Primary Examiner*—Jennifer McNeil
*Assistant Examiner*—Elizabeth D. Ivey
(74) *Attorney, Agent, or Firm*—Burr & Brown

(57) ABSTRACT

An integrated sintered body is provided having at least a first phase and a second phase. The first phase includes alumina as a main component, and the alumina contains a total amount of 12 weight percent or more and 50 weight percent or less of one or more of stabilized zirconia and partially stabilized zirconia. The second phase contains yttrium-aluminum garnet as a main component.

5 Claims, 2 Drawing Sheets

(a)

(b)

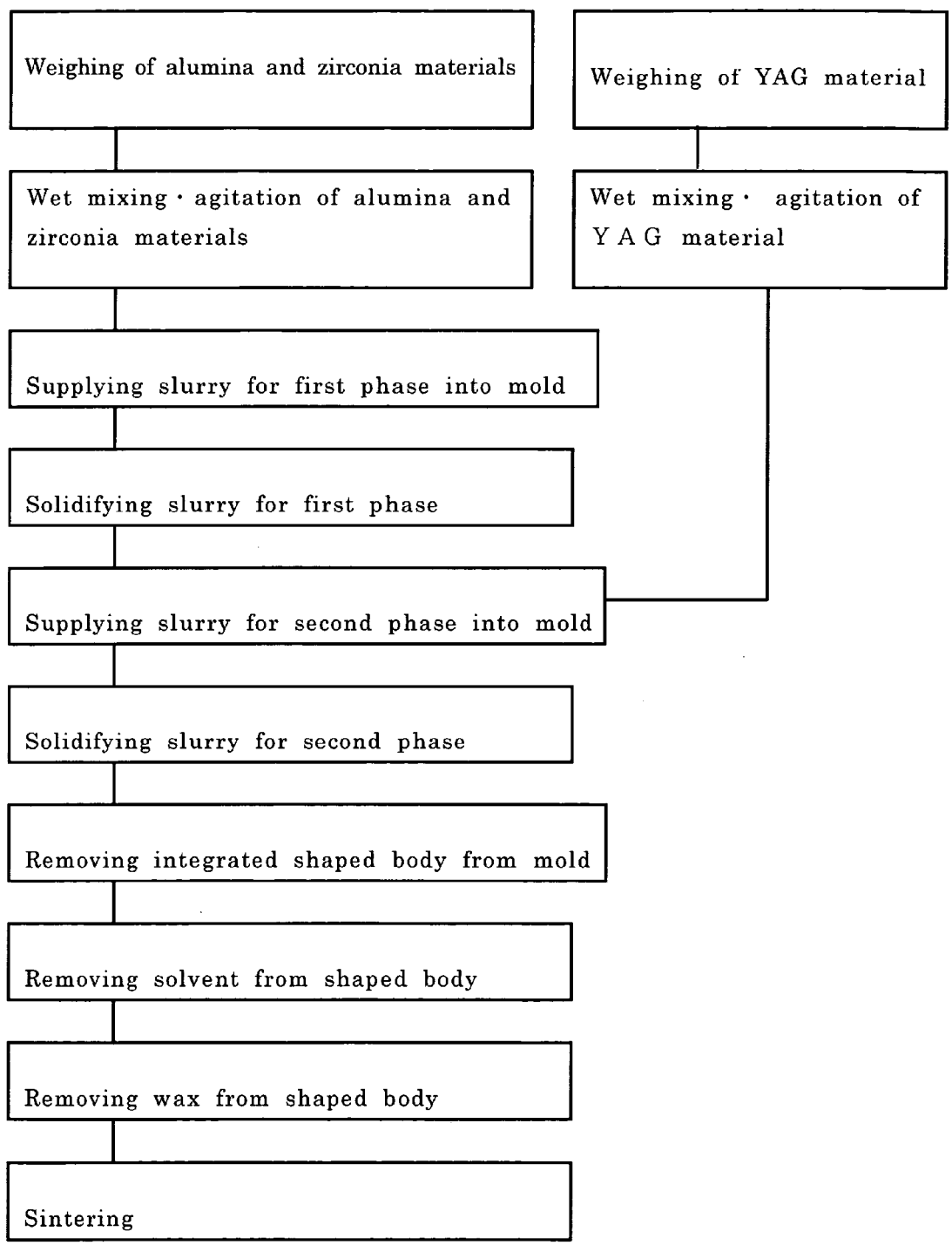

INTEGRATED SINTERED BODIES AND A METHOD OF PRODUCING THE SAME

This application claims the benefits of a Japanese Patent Application P2003-7488 filed on Jan. 15, 2003, the entirety of which is incorporated by reference.

BACKGROUND OF THE INVENTION

1. Field of the Invention

The present invention relates to an integrated sintered body having a sintered phase comprising yttrium-aluminum garnet and a method of producing the same.

2. Related Art Statement

In a semiconductor manufacturing system in which a super-clean state is necessary, halogen-based corrosive gases such as chlorine-based gases and fluorine-based gases are used as a deposition gas, an etching gas and a cleaning gas. For instance, in a semiconductor manufacturing system such as thermal CVD system, after the deposition, semiconductor cleaning gases composed of halogen-based corrosive gases such as $ClF_3$, $NF_3$, $CF_4$, HF and HCl are used. Furthermore, in the film deposition step, halogen-based corrosive gases such as $WF_6$, $SiH_2Cl_2$ and so on are used as gases.

It is thus desired that the members for use in a semiconductor manufacturing apparatus, for instance, members that are accommodated in the apparatus and an inner wall surface of a chamber, are provided with a coating that is highly corrosion-resistant against a halogen gas and its plasma and which are stable over a long period of time.

The assignee disclosed, in JP 2002-249864A, that when an yttria-alumina garnet film is formed on a surface of a substrate by use of a spraying method, excellent corrosion resistance against plasma of a halogen gas can be endowed and particles can be suppressed from generating. In plasma spraying process, however, it is difficult to form a film having a thickness over a relatively low limit, such as 0.5 mm.

The assignee also filed a Japanese patent application 2002-165,100, and disclosed a process of forming yttrium-aluminum garnet film on the surface of an alumina substrate by applying gel casting.

The inventors have further studied the above process, and found the following problems. That is, as the thickness of the yttrium-aluminum garnet film is made larger, cracks may occur in the film which increase the incidence of products having the film peeled from the underlying alumina substrate. Such cracks and peeling reduce the production yield.

SUMMARY OF THE INVENTION

An object of the present invention is to provide an integrated composite sintered body having a first phase and a second phase containing yttrium-aluminum garnet as a main component, in which the incidence of cracks in the second phase and peeling of the second phase from the first phase can be reduced to improve the production yield.

The present invention provides an integrated sintered body having at least first and second phases. The first phase comprises, as a main component, alumina containing a total amount of 12 weight percent or more and 50 weight percent or less of one or more of stabilized zirconia and partially stabilized zirconia. The second phase comprises yttrium-aluminum garnet as a main component.

The present invention further provides a method of producing an integrated sintered body having at least first and second phases. The first phase comprises, as a main component, alumina containing a total amount of 12 weight percent or more and 50 weight percent or less of one or more of stabilized zirconia and partially stabilized zirconia. The second phase comprises yttrium-aluminum garnet as a main component.

The present invention is based on the following discoveries. That is, it is possible to reduce the incidence of peeling of the yttrium-aluminum garnet phase from an alumina phase by adding a total amount of 12 weight percent or more and 50 weight percent or less of stabilized zirconia and/or partially stabilized zirconia into the alumina phase that is integrated with the garnet phase, even when the thickness of the garnet phase is made larger.

According to the present invention, either or both of stabilized zirconia and partially stabilized zirconia is added to alumina. The total amount of stabilized zirconia and partially stabilized zirconia is from 12 weight percent to 50 weight percent, based on 100 weight percent of a total amount of stabilized zirconia, partially stabilized zirconia and alumina.

It is possible to considerably reduce the incidence of peeling of the second phase by increasing the total content of stabilized zirconia and partially stabilized zirconia to a value of 12 weight percent or more. On this viewpoint, the total content of stabilized zirconia and partially stabilized zirconia may preferably be 20•weight percent or more, and more preferably be 25 weight percent or more. Further, it is possible to considerably reduce the incidence of peeling of the second phase by reducing the total content of stabilized zirconia and partially stabilized zirconia to a value of 50 weight percent or lower. From this viewpoint, the total content of stabilized zirconia and partially stabilized zirconia is preferably 40•weight percent or lower, and preferably, 35 weight percent or lower.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 1 (b) is a diagram schematically showing another example of a sintered body according to the present invention.

FIG. 2 is a flow chart showing a preferred example of a manufacturing process of a sintered body.

DETAILED DESCRIPTION OF THE INVENTION

Figure 1:
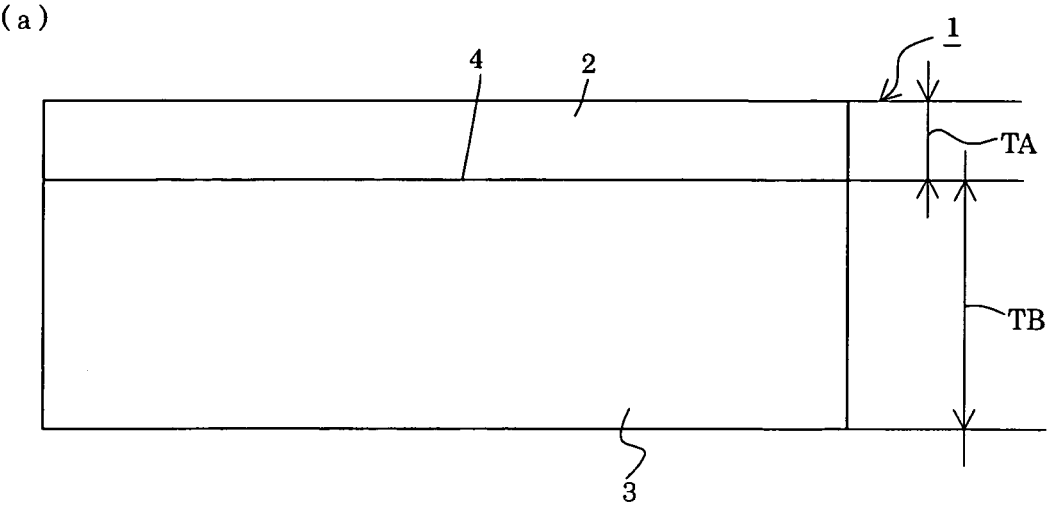
FIG. 1 (a) is a diagram schematically showing an example of a sintered body according to the present invention.
Figure 1:
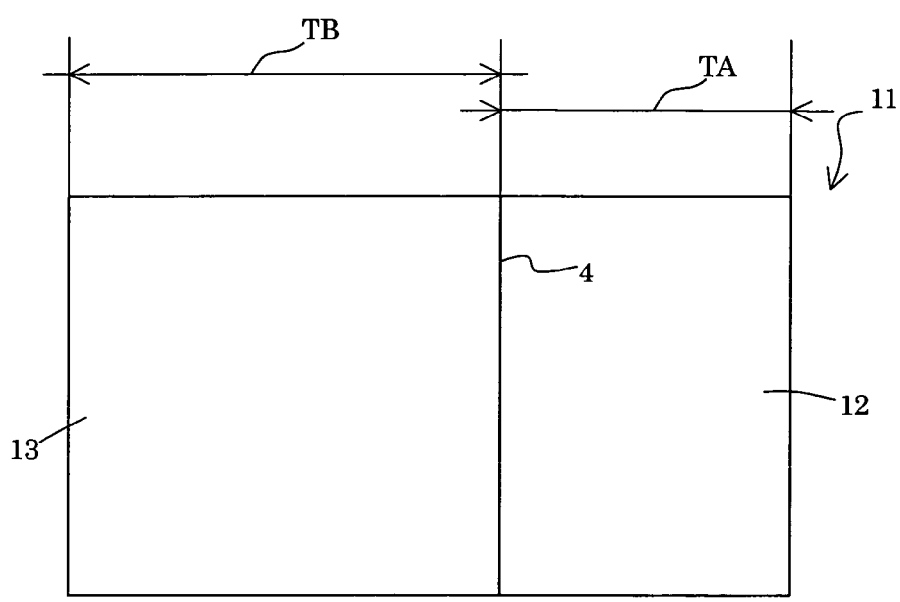

Yttrium-aluminum garnet constituting the second phase may be represented by the formula $Y_3Al_5O_{12}$ (YAG: $3Y_2O_3 \cdot 5Al_2O_3$). The composition contains yttria and alumina in a ratio of about 3:5 and has a garnet crystalline structure.

In the first phase, at least one of stabilized zirconia and partially stabilized zirconia is added to the alumina. The representatives and the ratios of stabilizing agents for the stabilized zirconia are listed as follows.

| Stabilizing agent | Ratio of Stabilizing agent (mole percent) |
|---|---|
| $Y_2O_3$ | 8–50 |
| CaO | 15–28 |
| $CeO_2$ | 15–50 |
| $Sm_2O_3$ | 8–33 |

The representatives and the ratios of stabilizing agents for the partially stabilized zirconia are listed as follows.

| Stabilizing agent | Ratio of Stabilizing agent (mole percent) |
|---|---|
| $Y_2O_3$ | 1–7 |
| CaO | 1–14 |
| $CeO_2$ | 1–14 |
| $Sm_2O_3$ | 1–7 |
| MgO | 1–50 |

Additional components and impurities other than yttrium-aluminum garnet may be contained in the second phase. However, the total content of components other than yttrium-aluminum garnet is preferably 10% by weight or less.

Additional components and impurities other than alumina, stabilized zirconia and partially stabilized zirconia may be contained in the first phase. However, the total content of the additional components and impurities is preferably 10% by weight or less.

In both the first and second phases, the powder mixture may contain powder of a third component. However, the third component is preferably not detrimental to the garnet phase and is preferably capable of replacing yttria or alumina in the garnet phase. Examples of such components include the following: $La_2O_3$; $Pr_2O_3$; $Nd_2O_3$; $Sm_2O_3$; $Eu_2O_3$; $Gd_2O_3$; $Tb_2O_3$; $Dy_2O_3$; $Ho_2O_3$; $Er_2O_3$; $Tm_2O_3$; $Yb_2O_3$; $Lu_2O_3$; MgO; CaO; SrO; $ZrO_2$; $CeO_2$; $SiO_2$; $Fe_2O_3$; and $B_2O_3$.

Preferably, the stabilized zirconia comprises yttria stabilized zirconia. Alternatively, the partially stabilized zirconia may preferably comprise yttria partially stabilized zirconia. More preferably, the content of yttria is 3 to 12 mole percent.

The shape of the first or second phase is not particularly limited. In a preferred embodiment, the first phase is a substrate 3 and the second phase is a film 2, and the substrate 2 and 3 are laminated as shown, for example, in FIG. 1(a). Reference numeral 4 represents an interface between the first and second phases. In an integrated sintered body 11 shown in FIG. 1(b), the first and second phases are both composed of bulky bodies, which are integrated as one body.

The sintered body according to the present invention may have one or more additional sintered phases other than the first and second phases. The shape or form of additional phases is not particularly limited. The additional phase is preferably laminated with the first and second phases. The additional phase may contact the first phase, the second phase, or both the first and second phases.

The first and second phases may be shaped by any processes, including gel cast molding described above, cold isostatic pressing, slip casting, slurry dipping, doctor blade and injection molding. The order of shaping steps of the first and second phases is not limited. For example, the first phase is shaped by gel cast molding and the second phase may be then shaped by gel cast molding or the other process to produce the shaped body. Alternatively, the second phase is shaped by gel cast molding or the other process to produce a shaped body, which may be then contained in a mold and the first phase may be then shaped by gel cast molding in the same mold.

In a preferred embodiment, at least one of the first and second phases is shaped by means of a gel cast molding process. According to the process, a slurry containing ceramic powder, a dispersing medium and gelling agent are molded and gelled with the addition of a cross-linking agent or a temperature adjustment so that the slurry is solidified to obtain a shaped body.

The gel cast molding process is known as a process for producing a shaped body of powder. However, it has not been known heretofore to shape the first phase with gel cast molding in producing an integrated shaped body having first and second phases. It has not also known to co-fire the thus obtained shaped body to produce a sintered body having the first and second phases.

Specifically, as shown in FIG. 2, the first phase (alumina phase) may be shaped in advance. That is, the first phase is shaped by gel cast molding or another shaping process. The raw material of the second phase (yttrium-aluminum garnet) is then weighed, wet mixed and agitated to obtain a slurry for the second phase. The shaped body of the first phase is contained in a mold, into which the slurry for the second phase is supplied and solidified to produce an integrated shaped body. The shaped body is removed from the mold. After the solvent and binder of the body are removed, the body is sintered.

According to the present invention, the thickness of the second phase ("TA" in FIG. 1 (a)) may be increased to 0.2 mm or more, and further to 0.5 mm or more. Even in this embodiment, peeling of the second phase may be effectively prevented.

In a preferred embodiment, the gel casting process is carried out as follows:

(1) A gelling agent and ceramic powder are dispersed in a dispersing agent to produce a slurry. The gelling agent includes polyvinyl alcohol and a prepolymer such as an epoxy resin, phenol resin and urethane resin. The slurry is then supplied into a mold and subjected to three dimensional cross linking reaction with a cross linking agent to solidify the slurry; and (2) An organic dispersing medium having a reactive functional group and the gelling agent are chemically bonded with each other to solidify the slurry. The process is described in Japanese patent publication 2001-335371A (US publication 2002-0033565).

According to the process, it is preferred to use an organic dispersing medium having two or more reactive functional groups. Further, 60 weight percent or more of the whole dispersing medium may preferably be an organic dispersing medium having a reactive functional group.

The organic dispersing medium having a reactive functional group preferably has a viscosity of 20 cps or lower at 20° C. The gelling agent preferably has a viscosity of 3000 cps or lower at 20° C. Specifically, it is preferred to react the organic dispersing medium having two or more ester bonds with the gelling agent having an isocyanate group and/or an isothiocyanate group to solidify the slurry.

The organic dispersing medium satisfies the following two conditions:

(1) The medium is a liquid substance capable of chemically reacting with the gelling agent to solidify the slurry; and (2) The medium is capable of producing a slurry with a high liquidity for the ease of supplying the slurry into the mold.

The organic dispersing medium necessarily has at least one reactive functional group, such as hydroxyl, carboxyl and amino groups capable of reacting with the gelling agent in the molecule for solidifying the slurry. The organic dispersing medium may preferably have two or more reactive functional groups for accelerating the solidification of the slurry.

Examples of a suitable liquid substance having two or more reactive functional groups include a polyalcohol (for example, a diol such as ethylene glycol, a triol such as glycerin or the like) and polybasic acid (dicarboxylic acid or the like).

The type of reactive functional groups in the molecule may be the same or different with respect to each other. Further, many reactive functional groups may be present such as polyethylene glycol.

On the other hand, when a slurry with a high liquidity is produced, it is preferred to use a liquid substance having a viscosity that is as low as possible. The substance preferably has a viscosity of 20 cps or lower at 20° C.

The above polyalcohol and polybasic acid may have a high viscosity due to the formation of hydrogen bonds. In this case, even when the polyalcohol or polybasic acid is capable of solidifying the slurry, they are not suitable as the reactive dispersing medium. In this case, it is preferred to use, as the organic dispersing medium, an ester having two or more ester bonds such as a polybasic ester (for example, dimethyl glutarate), or acid ester of a polyalcohol (such as triacetin).

Although an ester is relatively stable, it has a low viscosity and may easily react with the gelling agent having a high reactivity. Such an ester may also satisfy the above two conditions. Particularly, an ester having 20 or lower carbon atoms has a low viscosity, and may be suitably used as the reactive dispersing medium.

In the embodiment, a non-reactive dispersing medium may be also used. The dispersing agent is preferably an ether, hydrocarbon, toluene or the like. Further, when an organic substance is used as the non-reactive dispersing agent, it is preferred that 60 weight percent or more, or more preferably 85 weight percent or more, of the whole dispersing agent is occupied by the reactive dispersing agent for assuring the reaction efficiency with the gelling agent.

The reactive gelling agent is described in Japanese patent publication 2001-335371A (US publication 2002-0033565).

Specifically, the reactive gelling agent is a substance that is capable of reacting with the dispersing medium to solidify the slurry. The gelling agent of the present invention may be any substance, as long as it has a reactive functional group which can chemically react with the dispersing medium. The gelling agent may be a monomer, an oligomer, or a prepolymer capable of cross linking three-dimensionally such as polyvinyl alcohol, an epoxy resin, phenol resin, urethane resin or the like.

The reactive gelling agent preferably has a low viscosity of not larger than 3000 cps at 20° C. for assuring the liquidity of the slurry. A prepolymer or polymer having a large average molecular weight generally has a high viscosity. According to the present invention, a monomer or oligomer having a lower molecular weight, such as an average molecular weight (GPC method) of not larger than 2000, is preferably used.

Further, the term "viscosity" means the viscosity of the gelling agent itself (viscosity of 100 percent gelling agent) and does not mean the viscosity of a commercial solution containing a gelling agent (for example, viscosity of an aqueous solution of a gelling agent).

The reactive functional group of the gelling agent of the present invention may be selected considering the reactivity with the reactive dispersing medium. For example, when an ester having a relatively low reactivity is used as the reactive dispersing medium, a gelling agent having a highly reactive functional group such as an isocyanate group (—N=C=O) and/or an isothiocyanate group (—N=C=S) is preferably used.

An isocyanate group is generally reacted with an diol or diamine. An diol generally has, however, a high viscosity as described above. A diamine is highly reactive so that the slurry may be solidified before the supply into the mold.

Taking such matters into consideration, it is preferred that the slurry is solidified by a reaction of a reactive dispersion medium having ester bonds and a gelling agent having an isocyanate group and/or an isothiocyanate group. In order to further obtain a sufficient solidified state, the slurry is preferably solidified by a reaction of a reactive dispersion medium having two or more ester bonds and a gelling agent having an isocyanate group and/or an isothiocyanate group.

Suitable examples of a gelling agent having an isocyanate group and/or an isothiocyanate group include MDI (4,4'-diphenylmethane diisocyanate) type isocyanate (resin), HDI (hexamethylene diisocyanate) type isocyanate (resin), TDI (tolylene diisocyanate) type isocyanate (resin), IPDI (isophorone diisocyanate) type isocyanate (resin), and an isothiocyanate (resin).

Additionally, in the present invention, other functional groups may preferably be introduced into the foregoing basic chemical structures while taking the chemical characteristics such as compatibility with the reactive dispersion medium and the like into consideration. For example, in the case of a reaction with a reactive dispersion medium having ester bonds, it is preferable to introduce a hydrophilic functional group from the viewpoint of improving the homogeneity of the mixture during mixing by increasing the compatibility with esters.

Further, in the present invention, reactive functional groups other than isocyanate and isothiocyanate groups may be introduced into a molecule, and an isocyanate group and an isothiocyanate group may coexist. Furthermore, as a polyisocyanate, a large number of reactive functional groups may exist together.

The slurry for shaping the first or second phase may be produced as follows:

(1) The inorganic powder is dispersed into the dispersing medium to produce the slurry, into which the gelling agent is added; or (2) The inorganic powder and gelling agent are added to the dispersing medium at the same time.

The slurry preferably has a viscosity at 20° C. of 30000 cps or less, more preferably 20000 cps or less, for improving the workability when the slurry is filled into a mold. The viscosity of the slurry may be adjusted by controlling the viscosities of the aforementioned reactive dispersing medium and gelling agent, the kind of the powder, amount of the dispersing agent and content of the slurry (weight percent of the powder based on the whole volume of the slurry).

If the content of the slurry is too low, however, the density of the shaped body is reduced, leading to a reduction of the strength of the shaped body, crack formation during the drying and sintering and deformation due to increased shrinkage. Normally, the content of the slurry is preferably in a range of 25 to 75 volume percent, and more preferably in a range of 35 to 75 volume percent, for reducing cracks due to the shrinkage during a drying process, for example.

Further, various additives may also be added to the slurry for shaping purposes. Such additives include a catalyst for accelerating the reaction of the dispersing medium and gelling agent, a dispersing agent for facilitating the production of the slurry, an anti-foaming agent, a detergent, and a sintering aid for improving the sintering properties of the body.

According to the present invention, peeling between the first and second phases may be prevented, even when the area of the interface of the first and second phases is large. The present invention is thus suitable for the production of a sintered body having a large surface area. According to the process of the present invention, a sintered body having an interface area between the first and second phases of 100 $cm^2$ or more, for example 6400 $cm^2$, can be produced.

The thus obtained shaped body is then sintered to produce the sintered body of the present invention. The sintering temperature, atmosphere, temperature ascending and descending rates, and a holding time period at the maximum temperature is selected depending on the materials constituting the shaped body. The maximum temperature during the sintering is preferably in a range of 1400 to 1700° C.

EXAMPLES (Test Sample Numbers 1 to 22)

The integrated sintered body 1 shown in FIG. 1 (*a*) was produced, according to the scheme shown in FIG. 2. In the present example, an alumina substrate 3 and YAG (Yttrium-aluminum garnet) film 2 were continuously formed by a gel cast molding process.

Specifically, alumina powder ("AES-11C" supplied by Sumitomo Denko Inc.), 8 mole percent yttria stabilized zirconia powder (TZ8Y supplied by Toso Co. Ltd.), 25 weight parts of dimethyl glutarate (reactive dispersing medium), and 6 weight parts of an aliphatic polyisocyanate (gelling agent) were mixed in a pot mill to obtain a slurry for an alumina substrate. The total content of the alumina powder and 8 mole percent yttria stabilized zirconia powder was 100 weight parts. The content of 8 mole percent yttria stabilized zirconia powder was changed as shown in Table 1, provided that the total content of the alumina powder and 8 mole percent yttria stabilized zirconia powder was maintained at 100 weight parts. The slurry was filled in a mold and allowed to stand for a specific time period so that the slurry gelled and solidified to produce the shaped portion for the alumina substrate. The designed value of the thickness of the alumina substrate was 7.0 mm.

Further, 100 weight parts of yttrium-aluminum garnet powder, 27 weight parts of dimethyl glutarate (reactive dispersing medium) and 6 weight parts of an aliphatic polyisocyanate were mixed in a pot mill to obtain a slurry for a YAG film. The slurry was then filled in a mold and solidified to obtain a shaped portion for the YAG film. The designed value of thickness for the YAG film was 0.2 mm.

The thus obtained integrated shaped body 1 was removed from the mold, and heat treated at 250° C. for 5 hours to remove the solvent, dewaxed at 1000° C. for 2 hours, and then sintered at 1600° C. for 6 hours to obtain a composite sintered body.

The thus obtained sintered body was observed with an optical microscope at its cross section. The ratio of the number of samples with cracks or peeling observed to the total number of produced samples is shown in Table 1. Ten samples were produced for each test.

TABLE 1

| Test Number | Area of Interface ($cm^2$) | First layer (alumina + zirconia) Stabilizing Agent | First layer Zirconia Amount (wt %) | First layer Thickness (mm) | Second Layer (YAG) Thickness (mm) | Cracks, Peeling Incidence/ Number of Samples |
|---|---|---|---|---|---|---|
| 1 | 25 | — | None | 7 | 0.2 | 10/10 |
| 2 | 25 | $8molY_2O_3$ | 10 | 7 | 0.2 | 9/10 |
| 3 | 25 | $8molY_2O_3$ | 12 | 7 | 0.2 | 0/10 |
| 4 | 25 | $8molY_2O_3$ | 15 | 7 | 0.2 | 0/10 |
| 5 | 25 | $8molY_2O_3$ | 20 | 7 | 0.2 | 0/10 |
| 6 | 25 | $8molY_2O_3$ | 25 | 7 | 0.2 | 0/10 |
| 7 | 25 | $8molY_2O_3$ | 30 | 7 | 0.2 | 0/10 |
| 8 | 25 | $8molY_2O_3$ | 35 | 7 | 0.2 | 0/10 |
| 9 | 25 | $8molY_2O_3$ | 40 | 7 | 0.2 | 0/10 |
| 10 | 25 | $8molY_2O_3$ | 45 | 7 | 0.2 | 0/10 |
| 11 | 25 | $8molY_2O_3$ | 50 | 7 | 0.2 | 0/10 |
| 12 | 25 | $8molY_2O_3$ | 55 | 7 | 0.2 | 7/10 |
| 13 | 100 | $8molY_2O_3$ | 12 | 7 | 0.2 | 3/10 |
| 14 | 100 | $8molY_2O_3$ | 20 | 7 | 0.2 | 0/10 |
| 15 | 100 | $8molY_2O_3$ | 25 | 7 | 0.2 | 0/10 |
| 16 | 100 | $8molY_2O_3$ | 35 | 7 | 0.2 | 0/10 |
| 17 | 100 | $8molY_2O_3$ | 40 | 7 | 0.2 | 0/10 |
| 18 | 100 | $8molY_2O_3$ | 50 | 7 | 0.2 | 2/10 |
| 19 | 1600 | $8molY_2O_3$ | 20 | 7 | 0.2 | 3/10 |
| 20 | 1600 | $8molY_2O_3$ | 25 | 7 | 0.2 | 0/10 |
| 21 | 1600 | $8molY_2O_3$ | 35 | 7 | 0.2 | 0/10 |
| 22 | 1600 | $8molY_2O_3$ | 40 | 7 | 0.2 | 2/10 |

In test sample number 1, zirconia was not added into alumina, so that the incidence of cracks or peeling proved to be 10/10. In test sample number 2, 10 weight percent of 8 mole percent yttria stabilized zirconia was added and the incidence of cracks or peeling proved to be also high. In test sample numbers 3-11, the incidence of cracks or peeling was reduced. In test sample number 12, 55 weight percent of 8 mole percent yttria stabilized zirconia was added so that the incidence of cracks or peeling was elevated to 7/10.

In test sample numbers 13-18, the area of the contact interface between the film and the underlying substrate was enlarged to 100 $cm^2$. Needless to say, as the area of the interface of the film contacted with the substrate is made larger, the incidence of cracks or peeling considerably increased. In test sample number 13, 12 weight percent of 8 mole percent yttria stabilized zirconia was added, so that the incidence of cracks or peeling was elevated to 3/10. On the contrary, in test sample numbers 14-17, however, the incidence of cracks or peeling was 0/10. In test sample number 18, 50 weight percent of 8 mole percent yttria stabilized zirconia was added so that the incidence of cracks or peeling slightly increased to 2/10. As seen above, it was shown that the most preferred results were obtained when the content of 8 mole percent yttria stabilized zirconia was 20 to 40 weight percent.

In test sample numbers 19-22, the area of the contact interface between the film and the substrate is enlarged to 1600 cm². In test sample number 19, 20 weight percent of 8 mole percent yttria stabilized zirconia was added so that the incidence of cracks or peeling was elevated to 3/10. The incidence of cracks or peeling was 0/10, however, in test sample numbers 20 and 21. In test number 22, the content of the stabilized zirconia was 40 weight percent, so that the incidence of cracks or peeling slightly elevated to 2/10. As can be seen from the results, it was shown that the content of the stabilized zirconia is most preferably 25 to 35 weight percent.

(Test Sample Numbers 23 to 40)

Integrated sintered bodies for test sample numbers 23-40 were produced according to the same procedure described in connection with test sample numbers 1-22, except that the thickness of the YAG layer was increased to 0.5 mm. The results are shown in Table 2.

TABLE 2

| Test Number | Area of Interface (cm²) | First layer (alumina + zirconia) | | | Second Layer (YAG) Thickness (mm) | Cracks or Peeling Incidence/ Number of Samples |
|---|---|---|---|---|---|---|
| | | Zirconia | | | | |
| | | Stabilizing Agent | Content (wt %) | Thickness (mm) | | |
| 23 | 25 | 8molY₂O₃ | 12 | 7 | 0.5 | 1/10 |
| 24 | 25 | 8molY₂O₃ | 20 | 7 | 0.5 | 0/10 |
| 25 | 25 | 8molY₂O₃ | 25 | 7 | 0.5 | 0/10 |
| 26 | 25 | 8molY₂O₃ | 30 | 7 | 0.5 | 0/10 |
| 27 | 25 | 8molY₂O₃ | 35 | 7 | 0.5 | 0/10 |
| 28 | 25 | 8molY₂O₃ | 40 | 7 | 0.5 | 0/10 |
| 29 | 25 | 8molY₂O₃ | 45 | 7 | 0.5 | 0/10 |
| 30 | 25 | 8molY₂O₃ | 50 | 7 | 0.5 | 1/10 |
| 31 | 100 | 8molY₂O₃ | 12 | 7 | 0.5 | 4/10 |
| 32 | 100 | 8molY₂O₃ | 20 | 7 | 0.5 | 2/10 |
| 33 | 100 | 8molY₂O₃ | 25 | 7 | 0.5 | 0/10 |
| 34 | 100 | 8molY₂O₃ | 35 | 7 | 0.5 | 0/10 |
| 35 | 100 | 8molY₂O₃ | 40 | 7 | 0.5 | 0/10 |
| 36 | 100 | 8molY₂O₃ | 50 | 7 | 0.5 | 4/10 |
| 37 | 1600 | 8molY₂O₃ | 20 | 7 | 0.5 | 5/10 |
| 38 | 1600 | 8molY₂O₃ | 25 | 7 | 0.5 | 0/10 |
| 39 | 1600 | 8molY₂O₃ | 35 | 7 | 0.5 | 0/10 |
| 40 | 1600 | 8molY₂O₃ | 40 | 7 | 0.5 | 4/10 |

In test sample numbers 23-30, the thickness of the YAG layer was designed as 0.5 mm and 12 to 50 weight percent of 8 mole percent yttria stabilized zirconia was added, so that the incidence of cracks or peeling was low. It is most preferred that the content of the stabilized zirconia be 20 to 45 weight percent.

In test sample numbers 31-36, the area of the contact interface between the film and the substrate was enlarged to 100 cm². In test sample number 31, 12 weight percent of the stabilized zirconia was added so that the incidence of cracks or peeling was elevated to 4/10. In test sample number 36, 50 weight percent of the yttria stabilized zirconia was added so that the incidence of cracks or peeling was slightly elevated to 4/10. It was shown that the most preferred content of the stabilized zirconia is 25 to 40 weight percent.

In test sample numbers 37-40, the area of the contact interface between the film and the substrate was enlarged to 1600 cm². In test sample number 37, 20 weight percent of the stabilized zirconia was added so that the incidence of cracks or peeling was elevated to 5/10. In test sample number 40, 40 weight percent of the yttria stabilized zirconia was added so that the incidence of cracks or peeling was elevated to 4/10. It was shown that the most preferred content of the stabilized zirconia is 25 to 35 weight percent.

(Test Sample Numbers 41 to 46)

Integrated sintered bodies for test sample numbers 41-46 were produced according to the same procedure described in connection with test sample numbers 1-22, except that the thickness of the YAG layer was increased to 0.5 mm and the content of the stabilizing agent in the zirconia was changed. The results are shown in Table 3.

TABLE 3

| Test Number | Area of Interface (cm²) | First layer (alumina + zirconia) | | | | Second Layer (YAG) Thickness (mm) | Cracks Peeling Incidence/ Produced Samples |
|---|---|---|---|---|---|---|---|
| | | Zirconia | | | | | |
| | | Stabilizing Agent | Degree of Stabilization | Content (wt %) | Thickness (mm) | | |
| 41 | 1600 | 2mol | Partially Stabilized | 30 | 7 | 0.5 | 4/10 |
| 42 | 1600 | 3molY₂O₃ | Partially Stabilized | 30 | 7 | 0.5 | 4/10 |
| 43 | 1600 | 5molY₂O₃ | Partially Stabilized | 30 | 7 | 0.5 | 3/10 |
| 44 | 1600 | 8molY₂O₃ | Stabilized | 30 | 7 | 0.5 | 0/10 |
| 45 | 1600 | 10molY₂O₃ | Stabilized | 30 | 7 | 0.5 | 0/10 |
| 46 | 1600 | 15molCaO | Stabilized | 30 | 7 | 0.5 | 1/10 |

In test sample numbers 41-45, the thickness of the YAG layer was adjusted to 0.5 mm and the stabilized zirconia or partially stabilized zirconia was added. In test sample numbers 41 and 42, the incidence of cracks or peeling was reduced compared with that in the Comparative Examples. Moreover, the incidence of cracks or peeling may be reduced by increasing the content of the stabilizing agent to 5 mole percent, and further reduced by adding the stabilized zirconia. As can be seen from test sample number 46, the advantageous effects of the present invention can be obtained when a stabilizing agent other than yttria is added.

As described above, the present invention provides an integrated sintered body having a first phase and a second phase containing yttrium-aluminum garnet as a main component, in which the incidence of peeling of the second phase from the first phase may be reduced to improve the production yield.

The present invention has been explained referring to the preferred embodiments. However, the present invention is not limited to the illustrated embodiments which are given by way of examples only, and may be carried out in various modes without departing from the scope of the invention.

The invention claimed is:

1. A sintered body comprising:
    at least a first phase comprising alumina as a main component, the alumina comprising at least one of stabilized zirconia and partially stabilized zirconia in a total amount of at least 12 wt % to 50 wt % or less; and
    at least a second phase laminated with said first phase, said second phase comprising a yttrium-aluminum garnet as a main component;
    wherein a thickness of said first phase is larger than a thickness of said second phase.

2. The sintered body of claim 1, wherein said second phase has a thickness of 0.2 mm or more.

3. The sintered body of claim 1, wherein said first and second phases contact each other at an interface having an area of 25 $cm^2$ or more.

4. The sintered body of claim 1, wherein said first phase comprises stabilized zirconia.

5. The sintered body of claim 4, wherein said stabilized zirconia comprises 8 mole percent yttria stabilized zirconia.

* * * * *